(12) United States Patent
Johnson

(10) Patent No.: US 8,281,603 B2
(45) Date of Patent: Oct. 9, 2012

(54) FASTENER ASSEMBLY FOR CONNECTING ROCKET ENGINE NOZZLES

(75) Inventor: Bradley C. Johnson, Palm Beach Gardens, FL (US)

(73) Assignee: United Technologies Corporation, Hartford, CT (US)

( * ) Notice: Subject to any disclaimer, the term of this patent is extended or adjusted under 35 U.S.C. 154(b) by 1094 days.

(21) Appl. No.: 12/189,587

(22) Filed: Aug. 11, 2008

(65) Prior Publication Data

US 2010/0034616 A1 Feb. 11, 2010

(51) Int. Cl.
*F02C 7/20* (2006.01)
*F02K 1/00* (2006.01)

(52) U.S. Cl. ............. 60/799; 60/796; 60/770; 411/546; 411/424

(58) Field of Classification Search .................... 60/770, 60/771, 232, 796, 799; 411/456, 544, 353, 411/424, 546; 403/166; 239/265.11
See application file for complete search history.

(56) References Cited

U.S. PATENT DOCUMENTS

| | | |
|---|---|---|
| 3,474,701 A | 10/1969 | Setzler |
| 3,694,883 A | 10/1972 | Olcott |
| 3,881,392 A | 5/1975 | Curtis |
| 3,960,048 A | 6/1976 | Wagner |
| 4,435,112 A | 3/1984 | Becker |
| 4,477,024 A | 10/1984 | O'Driscoll et al. |
| 4,681,261 A | 7/1987 | Wetzler et al. |
| 4,729,512 A | 3/1988 | Laing |
| 4,967,599 A | 11/1990 | Donguy |
| 5,060,550 A | 10/1991 | Hoever et al. |
| 5,273,249 A * | 12/1993 | Peterson et al. ............. 248/550 |
| 5,343,698 A | 9/1994 | Porter et al. |
| 5,419,120 A | 5/1995 | Donguy |
| 5,445,469 A * | 8/1995 | Huck et al. ..................... 403/30 |
| 5,582,000 A | 12/1996 | Rannie et al. |
| 5,619,851 A | 4/1997 | Johnson et al. |
| 5,683,033 A | 11/1997 | Thayer |
| 6,209,312 B1 | 4/2001 | Singer et al. |
| 6,330,793 B1 * | 12/2001 | Hennessey ....................... 60/770 |
| 6,446,979 B1 * | 9/2002 | Steinetz et al. ................ 277/630 |
| 6,705,813 B2 * | 3/2004 | Schwab ......................... 411/526 |
| 6,817,184 B2 | 11/2004 | Groeber et al. |
| 6,904,755 B2 | 6/2005 | Canfield et al. |
| 7,269,951 B2 | 9/2007 | Gratton et al. |
| 2008/0143005 A1 * | 6/2008 | Lim et al. ..................... 264/29.2 |

FOREIGN PATENT DOCUMENTS

JP 2006249935 A2 9/2006
* cited by examiner

*Primary Examiner* — Ted Kim
*Assistant Examiner* — Andrew Nguyen
(74) *Attorney, Agent, or Firm* — Kinney & Lange, P.A.

(57) ABSTRACT

A sliding connection between components of dissimilar materials includes a first mating surface formed on a first component and a second mating surface formed on a second component and configured to mate with the first mating surface. The first component is connected to the second component at the first and the second mating surfaces by a fastener including a shank, a sleeve received by the shank, and a resilient member received by the shank and contained by the sleeve. The resilient member is configured to press the first mating surface and the second mating surface against one another and to permit the first mating surface to slide against the second mating surface.

24 Claims, 4 Drawing Sheets

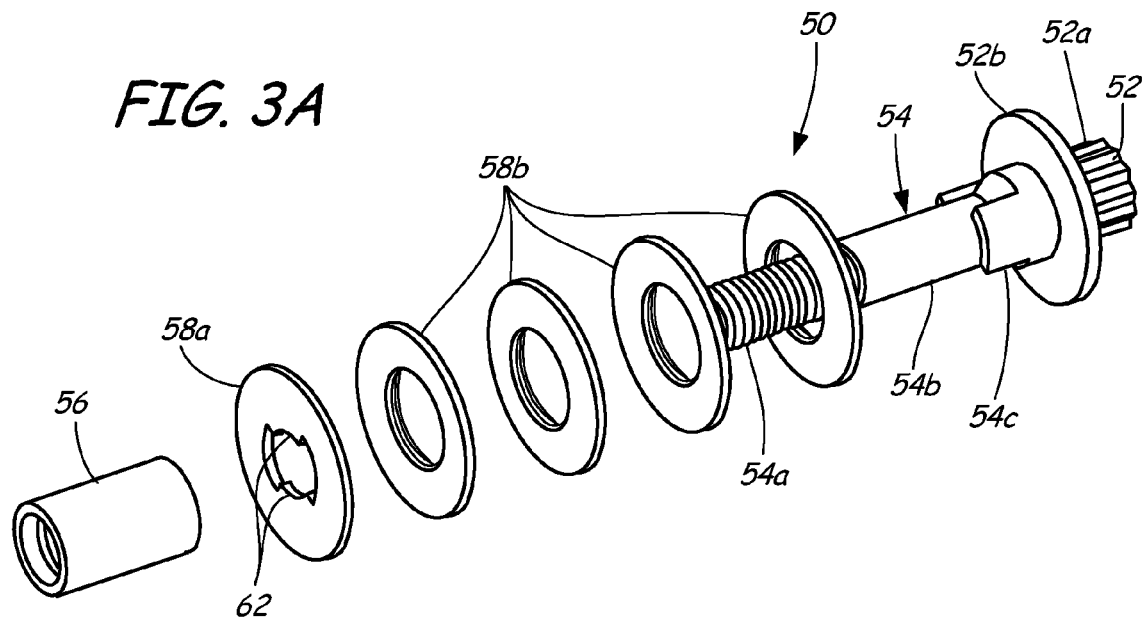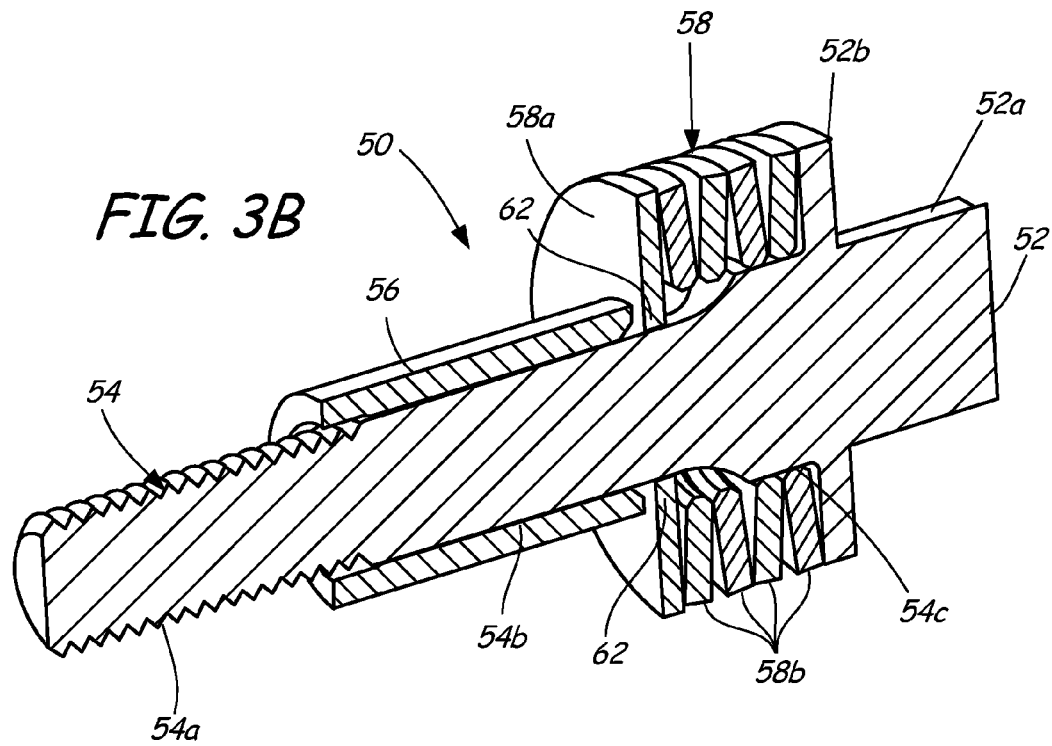

FASTENER ASSEMBLY FOR CONNECTING ROCKET ENGINE NOZZLES

STATEMENT OF GOVERNMENT INTEREST

This invention was made with Government support under Contract No. NNM06AB13C awarded by the National Aeronautics and Space Administration. The Government has certain rights in this invention.

BACKGROUND

This disclosure relates to connecting components of dissimilar materials.

One example of a rocket engine is the RL10 rocket engine manufactured by Pratt & Whitney Rocketdyne, a wholly owned subsidiary of the assignee. Another example of a rocket engine is the J-2X rocket engine also manufactured by Pratt & Whitney Rocketdyne. The three major components of such engines are a turbopump, a combustion chamber and an exhaust nozzle. The exhaust nozzle commonly includes a metallic regeneratively cooled nozzle connected to a non-metallic nozzle extension.

During operation of the rocket engine, the turbopump is used to supply a fuel and an oxidant, such as liquid hydrogen and liquid oxygen respectively, to the combustion chamber. The liquid hydrogen and liquid oxygen are expanded in the combustion chamber and burned to produce hot, pressurized rocket gases. The hot, pressurized gases are flowed at high velocities to the exhaust nozzle. The exhaust nozzle allows further expansion of the gases to increase the velocity of the gases before the gases exit the engine, thereby increasing the thrust of the rocket.

The regeneratively cooled nozzle may be fabricated from thin walled tubes shaped to form the required nozzle contour. Liquid hydrogen fuel is flowed through these tubes to provide convective cooling to the tubes and regenerative heating to the hydrogen fuel. The convective cooling ensures that the temperature of the tubes is consistent with the temperature limits required for structural integrity of the nozzle.

The non-metallic nozzle extension is commonly constructed from materials having low coefficients of thermal expansion, which allows the nozzle extension to operate in the extreme temperatures of rocket engine exhaust gas without being cooled. A common challenge in rocket engine design is connecting the metallic nozzle to the non-metallic nozzle extension. In spite of cooling the metallic nozzle, a significant mismatch in thermal expansion may exist between the metallic nozzle and the non-metallic nozzle extension. The thermal mismatch between nozzle and nozzle extension may act to place stresses on joints between the components, as the metallic nozzle grows radially at operating temperatures while the nozzle extension remains substantially the same size. For example, the expanded metallic nozzle may place bending stresses on bolts connecting the nozzle to the non-metallic nozzle extension.

SUMMARY

A sliding connection between components of dissimilar materials includes a first mating surface formed on a first component and a second mating surface formed on a second component and configured to mate with the first mating surface. The first component is connected to the second component at the first and the second mating surfaces by a fastener including a shank, a sleeve received by the shank, and a resilient member received by the shank and contained by the sleeve. The resilient member is configured to press the first mating surface and the second mating surface against one another and to permit the first mating surface to slide against the second mating surface.

BRIEF DESCRIPTION OF THE DRAWINGS

FIGS. 3A and 3B are two detail perspective views of the fastener of FIG. 2.

DETAILED DESCRIPTION

Figure 1:
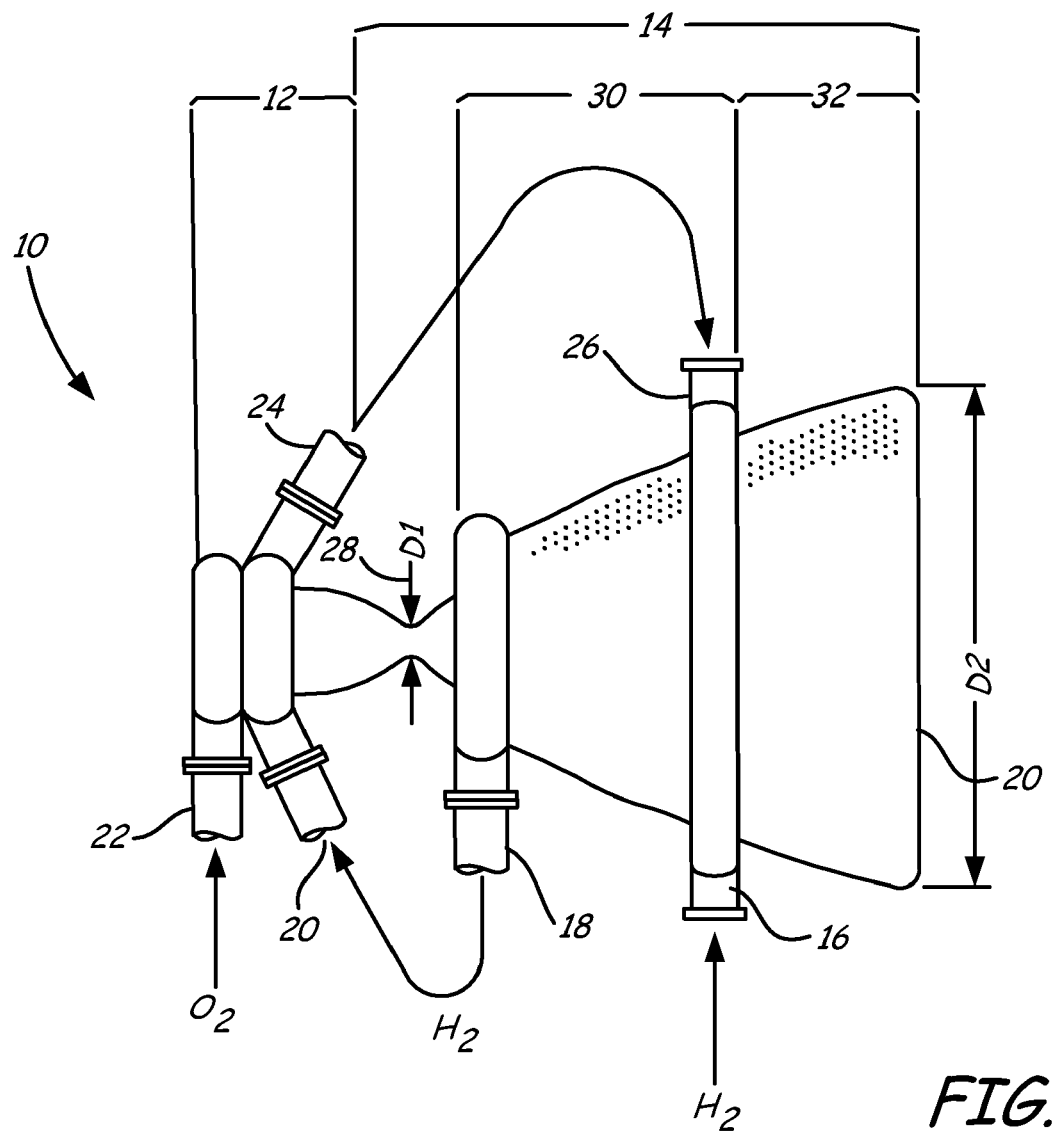
FIG. 1 is a schematic of a portion of a rocket engine according to the present invention.

FIG. 1 is a schematic of a portion of rocket engine 10 including combustion chamber 12, exhaust nozzle 14, coolant manifolds 16, 18, fuel and oxidant manifolds 20, 22, and exhaust manifolds 24, 26. Although a rocket engine 10 is used for discussion purposes, the concepts disclosed herein are applicable to the mating surfaces of any mechanical subassemblies having dissimilar materials. Immediately downstream of combustion chamber 12, exhaust nozzle 14 has a convergent region connected to a divergent region at throat 28. The divergent portion of exhaust nozzle 14 includes a metallic regernatively cooled nozzle 30 and a carbon-carbon nozzle extension 32 terminating at exhaust nozzle exit 34. Throat 28 has a diameter D1 and nozzle exit 30 has a diameter D2. The ratio of the area of exhaust nozzle 14 at any axial location to the area of throat 28 is the area ratio of nozzle 14 at that location.

Metallic regeneratively cooled nozzle 30 may be formed of a plurality of thin walled tubes that are tapered and shaped to form the required nozzle contour. Liquid fuel, such as liquid hydrogen, flows through the tubes to provide convective cooling to the tubes, and thereby to metallic nozzle 30, and regenerative heating to the hydrogen fuel. The convective cooling of metallic nozzle 30 ensures that the material limits of nozzle 30 are not exceeded during operation of engine 10.

Coolant manifold 16 supplies liquid hydrogen to the cooling tubes extending through metallic nozzle 30 and manifold 18 exhausts regeneratively heated hydrogen from the cooling tubes. Fuel manifold 20 supplies the regeneratively heated liquid hydrogen fuel from the cooling tubes in metallic nozzle 30 to combustion chamber 12. Oxidant manifold 22 supplies a liquid oxidant, such as liquid oxygen, to combustion chamber 12. The fuel and oxidant are flowed into combustion chamber 12 through an injector (not shown). An igniter (not shown) is also disposed in combustion chamber 12. Some rocket engines, such as engine 10, may include exhaust manifolds 24, 26. Exhaust manifold 24 extracts a portion of the hot, high pressure combustion gases and supplies them through exhaust manifold 26 to the interior of carbon-carbon nozzle extension 32. The diverted combustion gases are used to improve flow characteristics inside nozzle extension 32 by creating a supersonic boundary layer flow along the inner walls of nozzle extension 32.

During operation of rocket engine 10 including exhaust nozzle 14, fuel and oxidant are flowed into combustion chamber 10. The fuel and oxidant, e.g. hydrogen and oxygen, are burned to produce water vapor and hot, high pressure gases.

The total pressure of the gases may, for example, approach three thousand (3000) psi (approximately 20,500 kilopascals) at the throat and remains constant at any axial location of the nozzle. The static pressure is a constant at any axial location as long as the flow through the nozzle is, relatively uniform. The high pressure and temperature gases flow from the combustion chamber into exhaust nozzle 14 through the convergent region of nozzle 14 to throat 28. The gases are expanded from throat 28 to exit 34 where the gases develop the propulsive thrust for the vehicle to which rocket engine 10 is attached.

In spite of cooling metallic nozzle 30, a significant mismatch in thermal expansion may exist between metallic nozzle 30 and carbon-carbon nozzle extension 32. As such, the metallic nozzle 30 may expand more than the carbon-carbon nozzle extension 32 when subjected to heat. In turn, any fasteners or other connections affixing the metallic nozzle 30 and the carbon-carbon extension 32 may exhibit substantial sheer stresses. Although the embodiment of FIG. 1 discloses a metallic nozzle and carbon-carbon nozzle extension, alternative embodiments also include other material combinations for the components being mated. For example, the nozzle may be formed of one ceramic and the nozzle extension may be formed of a different ceramic having a lower coefficient of thermal expansion. Alternatively, the nozzle and nozzle extension may be formed of different metals, such as steel and aluminum respectively. Embodiments disclosed herein therefore provide a sliding connection between components of dissimilar materials that permits thermal expansion of one component without stressing the connection with the other component.

Figure 2:
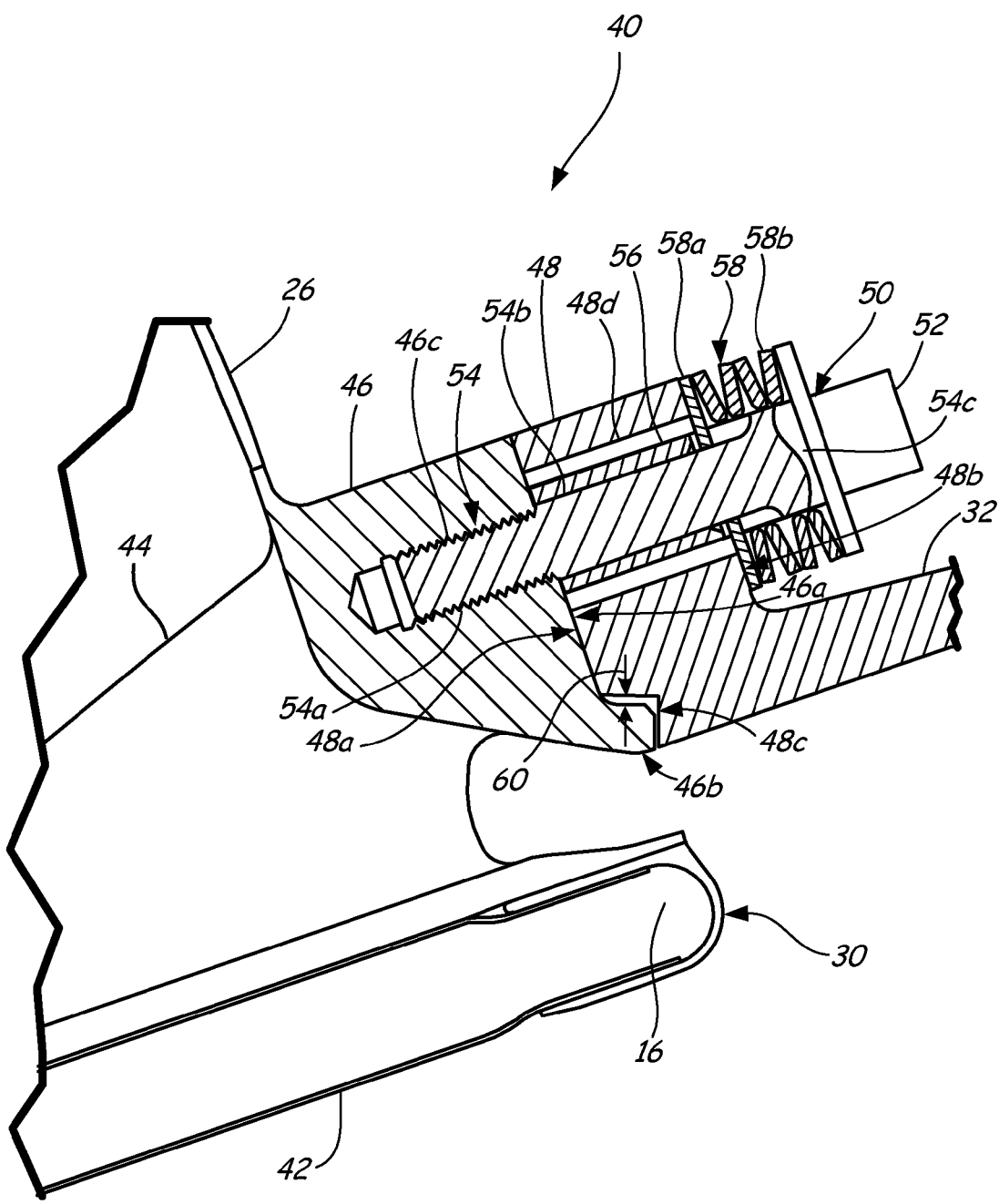
FIG. 2 is a section view of the rocket engine of FIG. 1 including a sliding connection between the metallic nozzle and the carbon-carbon nozzle extension secured by a fastener according to the present invention.

FIG. 2 is a section view of engine 10 including sliding connection 40 between metallic nozzle 30 and carbon-carbon nozzle extension 32 secured by fastener 50 according to the present invention. Engine 10 includes coolant manifold 16, exhaust manifold 26, metallic nozzle 30, carbon-carbon nozzle extension 32, sliding connection 40, and fastener 50. Coolant manifold 16 feeds thin walled cooling tubes 42 arranged circumferentially about the axis of engine 10 to form the contour of metallic nozzle 30. Exhaust manifold 26 is connected to metallic nozzle 30 by a set of ribs 44 distributed circumferentially around the radially outer surface of nozzle 30.

Sliding connection 40 includes conical boss 46, conical flange 48, and fastener 50. Conical boss 46 is integral with and extends from exhaust manifold 26 connected to metallic nozzle 30. Conical flange 48 is integral with and extends from carbon-carbon nozzle extension 32. Conical boss 46 includes aftward conical surface 46a, lip 46b, and threaded hole 46c. Conical flange 48 includes forward conical surface 48a, aftward conical surface 48b, notch 48c, and through hole 48d. Conical boss 46 receives conical flange 48 such that aftward surface 46a of boss 46 mates with forward surface 48a of flange 48 and threaded hole 46c and through hole 48d are substantially centrally aligned. Notch 48c receives lip 46b such that there is a small radial gap 60 between notch 48c and lip 46b.

Fastener 50 includes head 52, shank 54, sleeve 56 and resilient member 58. Resilient member 58 includes flat washer 58a and conical spring washers 58b. Shank 54 includes threaded portion 54a, unthreaded portion 54b, and slotted shoulder 54c. Slotted shoulder 54c of shank 54 receives resilient member 58 and unthreaded portion 54b receives sleeve 56. Sleeve 56 contains resilient member 58 on fastener 50. Fastener 50 passes through through hole 48d in flange 48 and threaded portion 54a of shank 54 engages threaded hole 46c in boss 46. The bottom of sleeve 56 of fastener 50 abuts aftward surface 46a of boss 46. Interposed between head 52 of fastener 50 and aftward surface 48b of flange 48 is flat washer 58a and conical spring washers 58b of resilient member 58. Shank 54 of fastener 50 has sufficient length to leave a positive gap in which resilient member 58 may reside. Flat washer 58a has two tabs 62 configured to be received by slotted shoulder 54c of shank 54 and to permit resilient member 58 to move with respect to shank 54. Head 52 of fastener 50 compresses conical spring washers 58b against flat washer 58a, which in turn presses against aftward surface 48b of flange 48. Through hole 48d in flange 48 has a diameter that is larger than a diameter of shoulder bolt 50.

Although FIG. 2 shows only one fastener securing the sliding connection between nozzle and nozzle extension, additional embodiments may include a number of fasteners distributed circumferentially about the main axis of the engine to engage the boss and the flange at a number of locations. An example of a spring washer is a, Belleville washer manufactured by Barnes Group Inc. of Bristol, Conn.

At assembly of engine 10, metallic nozzle 30 and carbon-carbon nozzle extension may be joined at sliding connection 40 by fastener 50 in the arrangement shown in FIG. 2. For example, an operator may engage boss 46 with fastener 50 until sleeve 56 abuts aftward surface 46a of boss 46. The operator may now apply a standard torque to fastener 50. The torque applied by the operator generates a known preload on aftward surface 48b of flange 48 and between forward surface 48a of flange 48 and aftward surface 46a of boss 46 as head 52 of fastener 50 compresses conical spring washers 58b against flat washer 58a pressing against aftward surface 48b of flange 48. However, because sleeve 56 abuts aftward surface 46a of boss 46 and slotted shoulder 54c of shank 54, the torque load generated by fastener 50 is applied directly onto aftward surface 46a of boss 46 and not onto on aftward surface 48b of flange 48. This arrangement of sleeve 56 thereby ensures only the preload generated by resilient member 58 is applied to sliding connection 40. Alternative embodiments may include, in addition to or lieu of conical spring washers 58b, curved spring washers, finger spring washers, wave spring washers, compression coil springs, clover springs, and non-metallic elastomeric washers.

As conical spring washers 58b compress, flat washer 58a may move with respect to shank 54 as two tabs 62 of flat washer 58a slide along slotted shoulder 54c of shank 54. A preload may be applied to connection 40 by fastener 50 to structurally join the interface between nozzle 30 and nozzle extension 32, while simultaneously allowing aftward surface 46a of boss 46 to slide against forward surface 48a of flange 48 and flat washer 58a to slide against aftward surface 48b of flange 48. The preload on sliding connection 40 may be adjusted by varying the stiffness and number of spring washers 58b, the length of shank 54, and the torque applied to fastener 50. The stiffness and number of spring washers 58b are selected to provide the necessary clamping force required throughout engine operation, while remaining in a linear spring resiliency range. The load provided by spring washers 58b is therefore consistent for all operating conditions, regardless of thermal growth in fastener 50. Flat washer 58a facilitates sliding and acts to smooth the load generated by spring washer 58b against aftward surface 48b of conical flange 48. In the assembled state shown in FIG. 2, conical spring washers 58b should not, generally speaking, be compressed flat.

Fastener 50 facilitates operation of sliding connection 40 by generating a preload on sliding connection 40 that is sufficient to structurally join the interface between nozzle 30 and nozzle extension 32 and simultaneously allow conical boss 46 to slide against concial flange 48. Fastener 50 simplifies assembly and maintenance of rocket engine 10 by providing a preconfigured assembly that secures sliding connection 40 between metallic nozzle 30 and carbon-carbon nozzle extension 32 without necessitating additional steps, such as assembling flat washer 58a and spring washers 58b onto shank 54.

FIGS. 3A and 3B are detail perspective views of fastener 50 of FIG. 2 including head 52, shank 54, sleeve 56, flat washer 58a, and conical spring washers 58b. Shank 54 includes threaded portion 54a, unthreaded portion 54b, and slotted shoulder 54c. FIG. 3A is an exploded view of fastener 50 and FIG. 3B is a view of assembled fastener 50. As can be seen in FIGS. 3A and 3B, resilient member 58 including flat washer 58a and conical spring washers 58b is received by slotted shoulder 54c of shank 54 such that two tabs 62 of flat washer 58a fit into the two slots of slotted shoulder 54c. Head 52 includes top portion 52a and bottom portion 52b. Top portion 52a is configured to be engaged by a tool. Bottom portion 52b of head 52 may have a diameter greater than the diameter of top portion 52a and may be configured to contain resilient member 58 as shown in FIG. 3B. Sleeve 56 is received by unthreaded portion 54b of shank 54 and abuts slotted shoulder 54c and two tabs 62 of flat washer 58a, thereby containing resilient member 58 on shank 54 and forming integral fastener 50. Sleeve 56 may be, for example, press fit onto unthreaded portion 54b of shank 54. Once fastener 50 is assembled, flat washer 58a may move with respect to shank 54 to compress conical spring washers 58b as two tabs 62 of flat washer 58a slide in the two slots of slotted shoulder 54c. The two slots of slotted shoulder 54c may be configured to limit travel of flat washer 58a such that conical spring washers 58b are not compressed beyond a range of linear spring resiliency.

Figure 4:
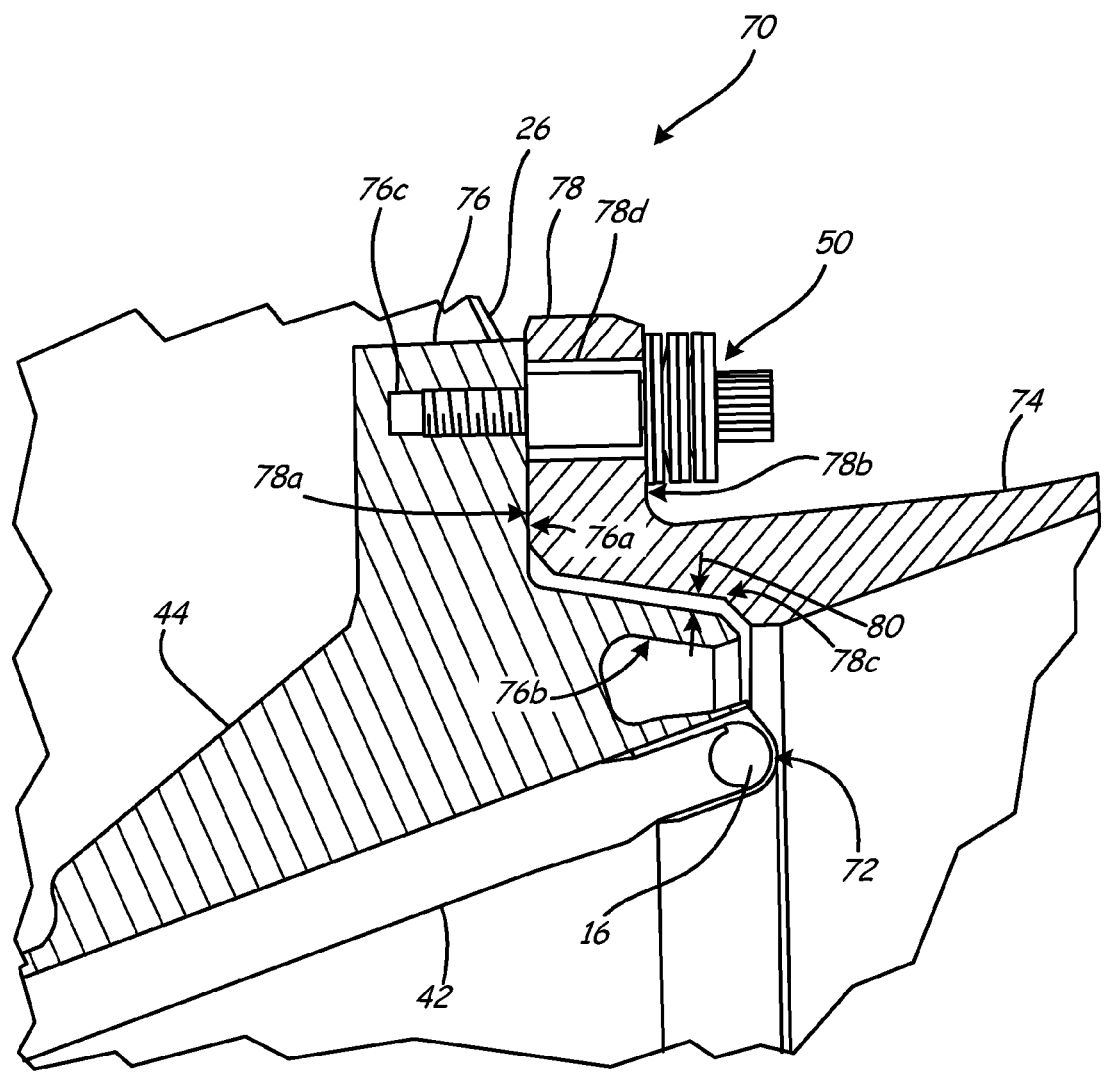
FIG. 4 is a section view of a sliding connection between a steel nozzle and a aluminum nozzle extension secured by the fastener of FIGS. 2-3B.

FIG. 4 is a section view of an alternative sliding connection 70 between steel nozzle 72 and aluminum nozzle extension 74 secured by fastener 50 according to the present invention. In the embodiment of FIG. 4, sliding connection 70 includes boss 76 and flange 78 that protrude radially from nozzle 72 and nozzle extension 74 respectively. Sliding connection 70 also includes fastener 50. Boss 76 includes aftward surface 76a, lip 76b, and threaded hole 76c. Flange 78 includes forward surface 78a, aftward surface 78b, notch 78c, and through hole 78d. Aftward surface 76a of boss 76, and forward and aftward surfaces 78a, 78b of flange 78, instead of being conical, are axial, i.e. are substantially perpendicular to an axis of symmetry of the engine to which nozzle 72 and nozzle extension 74 are attached. Boss 76 receives flange 78 such that aftward surface 76a of boss 76 mates with forward surface 78a of flange 78 and threaded hole 76c and through hole 78d are substantially centrally aligned. Notch 78c receives lip 76b such that there is a small radial gap 80 between notch 78c and lip 76b. As with the embodiment of FIG. 2, the load on sliding connection 70 generated by fastener 50 may be adjusted to structurally join the interface between nozzle 72 and nozzle extension 74, while simultaneously allowing aft surface 76a of boss 76 to slide against forward surface 78a of flange 78.

Ordinary skilled artisans will recognize that changes may be made in form and detail without departing from the spirit and scope of the disclosure.

The invention claimed is:

1. A sliding connection between components of dissimilar materials, the connection comprising:
a first mating surface formed on a first component; and
a second mating surface formed on a second component and configured to mate with the first mating surface;
wherein the first component is connected to the second component at the first and the second mating surfaces by a fastener comprising:
a head;
a shank extending from the head, the shank comprising:
a slotted shoulder connected to the head;
an unthreaded shaft connected to the slotted shoulder; and
a threaded shaft connected to the unthreaded shaft;
a sleeve received by the shank so as to be positioned between the head and the first mating surface of the first component within a through hole in the second component, wherein the sleeve is received by the unthreaded shaft and abuts a bottom of the slotted shoulder and the first mating surface of the first component; and
a resilient member received by the shank and contained between the sleeve and the head;
wherein the resilient member is configured to press the first mating surface and the second mating surface against one another and to permit the first mating surface to slide against the second mating surface.

2. The connection of claim 1, wherein the sleeve permits a torque load generated by the fastener to be applied directly onto the first mating surface of the first component.

3. The connection of claim 1, wherein the resilient member comprises:
a plurality of resilient washers interposed between the head and the sleeve; and
a flat washer interposed between the resilient washers and the sleeve and having two tabs configured to be received by the slotted shoulder.

4. The connection of claim 3, wherein the flat washer is configured to compress the resilient washers against the head by sliding along the slotted shoulder.

5. The connection of claim 4, wherein the slotted shoulder and the sleeve are configured to contain the flat washer such that the flat washer and the resilient washers may not be removed.

6. The connection of claim 5, wherein the sleeve and the slotted shoulder limit travel of the flat washer such that the resilient washers are not compressed beyond a range of linear resiliency.

7. The connection of claim 1, wherein the head comprises:
a top portion configured to be engaged by a tool; and
a bottom portion connected to the top portion and configured to receive the resilient member.

8. A sliding connection between a liquid fuel rocket engine nozzle and a nozzle extension of dissimilar materials, the connection comprising:
a boss formed on an aft end of the nozzle; and
a flange formed on a forward end of the nozzle extension and connected to the boss by a fastener comprising:
a head;
a shank connected to the head, the shank including a slotted shoulder connected to the head;
a sleeve received by the shank and that abuts a bottom of the slotted shoulder and an aft surface of the boss; and
a resilient member interposed between the sleeve and the head, the resilient member comprising two tabs configured to be received by the slotted shoulder;
wherein the resilient member is configured to press the aft surface of the boss and a forward surface of the flange against one another and to permit the aft surface of the boss to slide against the forward surface of the flange; and wherein the sleeve permits a torque load generated by the fastener to be applied directly onto the aft surface of the boss.

9. The connection of claim 8,
wherein the shank comprises:
an unthreaded shaft connected to the slotted shoulder; and
a threaded shaft connected to the unthreaded shaft;
wherein the sleeve is received by the unthreaded shaft; and
wherein the resilient member comprises:
a plurality of resilient washers interposed between the head and the sleeve; and
a flat washer interposed between the resilient washers and the sleeve, the flat washer having the two tabs configured to be received by the slotted shoulder.

10. The connection of claim 9, wherein the flat washer is configured to compress the resilient washers against the head by sliding along the slotted shoulder.

11. The connection of claim 10, wherein the slotted shoulder and the sleeve are configured to contain the flat washer such that the flat washer and the resilient washers may not be removed.

12. The connection of claim 11, wherein the sleeve and the slotted shoulder limit travel of the flat washer such that the resilient washers are not compressed beyond a range of linear resiliency.

13. The connection of claim 8, wherein the head comprises:
a top portion configured to be engaged by a tool; and
a bottom portion connected to the top portion and configured to receive the resilient member.

14. The connection of claim 8, wherein the nozzle comprises a first material having a first coefficient of thermal expansion, and the nozzle extension comprises a second material having a second coefficient of thermal expansion different than the first coefficient of thermal expansion.

15. The connection of claim 8, wherein the nozzle is formed of a metallic material and the nozzle extension is formed of a non-metallic material.

16. The connection of claim 15, wherein the nozzle extension comprises a carbon fiber.

17. The connection of claim 8, wherein the aft surface of the boss and the forward surface of the flange lie in parallel conical or axial planes with respect to the nozzle and the nozzle extension.

18. A liquid fuel rocket engine comprising:
a combustion chamber;
a metallic nozzle connected to an aft end of the combustion chamber and comprising a conical or axial face boss formed on an aft end of the metallic nozzle; and
a non-metallic nozzle extension comprising a conical or axial face flange formed on a forward end of the non-metallic nozzle extension;
wherein the non-metallic flange is connected to the metallic boss by a fastener comprising:
a head;
a shank connected to the head and passing through a hole in the non-metallic flange and threadably engaging the metallic boss, the shank comprising a slotted shoulder connected to the head;
wherein the shank further comprises an unthreaded shaft connected to the slotted shoulder; and
a threaded shaft connected to the unthreaded shaft and threadably engaging the metallic boss;
a sleeve received by the shank and positioned in the hole, the sleeve being positioned between the head and an aft surface of the metallic boss, wherein the sleeve is received by the unthreaded shaft and abuts a bottom of the slotted shoulder and the aft surface of the metallic boss; and
a resilient member received by the shank and interposed between the head and the sleeve, the resilient member comprising:
a plurality of resilient washers interposed between the head and an aft surface of the non-metallic flange; and
a flat washer interposed between the resilient washers and the aft surface of the non-metallic flange and having two tabs configured to be received by the slotted shoulder;
wherein the resilient member is configured to be compressed between the head and the aft surface of the non-metallic flange such that the aft surface of the metallic boss is permitted to slide against a forward surface of the non-metallic flange; and
wherein the sleeve permits a torque load generated by the fastener to be applied directly onto the aft surface of the metallic boss.

19. The engine of claim 18, wherein the flat washer is configured to compress the resilient washers against the head by sliding along the slotted shoulder.

20. The engine of claim 19, wherein the slotted shoulder and the sleeve are configured to contain the flat washer such that the flat washer and the resilient washers may not be removed.

21. The engine of claim 20, wherein the sleeve and the slotted shoulder limit travel of the flat washer such that the resilient washers are not compressed beyond a range of linear resiliency.

22. The engine of claim 18, wherein the head comprises:
a top portion configured to be engaged by a tool; and
a bottom portion connected to the top portion and configured to receive the resilient washers.

23. The engine of claim 18, wherein the metallic nozzle comprises a first material having a first coefficient of thermal expansion, and the non-metallic nozzle extension comprises a second material having a second coefficient of thermal expansion different than the first coefficient of thermal expansion.

24. The engine of claim 23, wherein the nozzle extension comprises a carbon fiber.

* * * * *